United States Patent [19]

Szalai et al.

[11] Patent Number: 5,433,287
[45] Date of Patent: Jul. 18, 1995

[54] AXLE ASSEMBLY FOR VEHICLES IN PORTAL ARRANGEMENT

[76] Inventors: Gabor Szalai, Melykut u. 83, H-9002 Gyorujbarat; Albert Istok, Szabolcska u. 8, H-9023 Gyor; Peter Szij, Batthyany t. 11, H-9022 Gyor, all of Hungary

[21] Appl. No.: 160,354

[22] Filed: Nov. 29, 1993

[30] Foreign Application Priority Data

Nov. 27, 1992 [HU] Hungary ............... 9203746

[51] Int. Cl.⁶ ............... B60K 17/04; B60G 9/04
[52] U.S. Cl. ............... 180/353; 180/371; 280/688; 280/711
[58] Field of Search ............... 180/353, 374, 375, 371; 280/688, 689, 697, 698, 701

[56] References Cited

U.S. PATENT DOCUMENTS

| | | | |
|---|---|---|---|
| 3,150,531 | 9/1964 | Singer | 180/371 |
| 3,420,327 | 1/1969 | Nallinger | 180/375 |
| 3,862,667 | 1/1975 | Wolansky | 180/371 |
| 4,343,375 | 8/1982 | Manning | 180/353 |
| 4,934,733 | 6/1990 | Smith et al. | 280/688 |

FOREIGN PATENT DOCUMENTS

| | | | |
|---|---|---|---|
| 54360 | 2/1938 | Denmark | 180/371 |
| 55569 | 12/1938 | Denmark | 180/371 |
| 456096 | 11/1991 | European Pat. Off. | 180/371 |

Primary Examiner—Karin L. Tyson
Attorney, Agent, or Firm—Young & Thompson

[57] ABSTRACT

A driven axle assembly for a vehicle includes a center housing, suspension elements connecting the center housing to the vehicle, a main drive arranged in the center housing, side drives arranged on outer ends of the center housing, and wheel hub units connected to the side drives, respectively,, wherein a portal distance is provided between a longitudinal axis of a differential gear unit arranged in the center housing and a longitudinal axis of the wheel heads. The improvement achieved by this invention is that the suspension elements connecting the center housing to the vehicle are also attached to the housings for the drives arranged both inside and on outer ends of the center housing in an integrated manner. Therefore, the housings for the side drives, the center housing, and the suspension elements are formed as a tight compact unit.

5 Claims, 3 Drawing Sheets

AXLE ASSEMBLY FOR VEHICLES IN PORTAL ARRANGEMENT

BACKGROUND OF THE INVENTION

1. Field of the Invention

The invention relates to a driven axle assembly which comprises
a centre housing,
suspension elements connecting the centre housing to the vehicle,
a main drive arranged in the centre housing,
side drives arranged on outer ends of the centre housing, and
wheel hub units connected to the side drives, respectively, wherein a portal distance is provided between a longitudinal axis of a differential gear unit arranged in the centre housing and a longitudinal axis of the wheel heads.

2. Description of the Related Art

Axle assemblies with this so called portal arrangement are more widely used nowadays to enhance public transport, to speed up the passenger traffic, to make the entry and exit easier in the case of motor busses. The outstanding advantage of the portal arrangement is in that the floor height of the vehicle can be as low as 320 to 350 mm measured from the ground level so there is only one step needed to step up from the pavement level. However, there are certain difficulties with driven rear axles of the vehicles since not only the required drives must find space, but sufficient stability and rigidness must be provided and the connections to the vehicle frame must be stable enough as well.

In case of known axle assemblies (as it is described inter alia in GE patent specification No. 340 27 806), the main drive is put aside as far as possible from the longitudinal axis of the vehicle. Onto the differential being a part of main drive, a pair of bevel and disk gears is attached, wherefrom the revolution is led to the side drives. Thus, increase of the torque and reduction of numbers of the rotation are carried out in two steps. The portal distance can be measured between the longitudinal axis of the differential arranged in the centre housing and the longitudinal axis of the outlet axle shafts, i.e. that of the hub units: this is the measure with which the floor level of the vehicle can be made lower in comparison to that of the vehicle with a conventional axle assembly.

In the prior art proposals, the support and suspension elements are not parts of the axle assembly. In the conventional arrangements, for example, on each side, 2×3 pieces that is altogether 12 pieces, of massive connecting eyes are provided on housings of the side drives, and the choice, outline and attachment of these support and suspension elements are left over to the producer of the motor busses. The bus producers form these suspension elements as welded constructions made of more than one piece, these pieces are then fixed to each other as well as to the housings of the side drives and the frame of the vehicle by threaded connections. Onto this support system of beams screwed to each other, the air springs and the shock absorbers of the vehicle are attached, too.

In practice, it proves to be unfavourable per se that the support and suspension elements are constructed from more than one piece. At each and every threaded connection, the strength of the bearing construction is drastically reduced, and at the same time, the screwed connection is a stress collecting area. In known solutions, for example, four separate elements are screwed onto the axle assembly. It has been proven, as well, that even the most special threaded connections get inevitably loose from time to time, which is outmostly inconvenient in terms of safety of the conventional axle assemblies. At the screwed connections, the closed beams change to be an open one, and this further reduces the strength and stability of conventional suspension elements.

It cannot be disregarded that, as a result of what has been said above, the known support and suspension elements must be over-dimensioned and sufficient stability must be provided at the screwed connections as well. This makes the assembly not only a more complicated one but the self weight of the axle assembly will be increased, too.

In the bus construction industry, the tendency can be observed most recently, that the bus producers are not willing to manufacture the support and suspension elements by themselves and it is inconvenient to procure them from outside suppliers. Thus, the still unsolved need is more and more urgent that the producer of axle assemblies should provide their products as a complete construction having all fasteners, and suspension elements mounted on them ready for installation.

SUMMARY OF THE INVENTION

The main objective of the present invention is to provide an axle assembly which fully satisfies the above mentioned need to have all of the necessary fasteners and suspension elements in a compact construction and which, however preserves all benefits of the portal arrangement. A further object is to increase the safety of the known solutions and to make them simpler.

Hence, according to the invention, a driven axle assembly for a vehicle comprises:
a centre housing,
suspension elements connecting the centre housing to the vehicle,
a main drive being arranged in the centre housing and including a
differential gear unit,
side drives arranged on outer ends of the centre housing, and
wheel hub units connected to the side drives, respectively,
wherein a portal distance is provided between a longitudinal axis of the differential gear unit arranged in the centre housing and a longitudinal axis of the wheel hub units.

The improvement is that the suspension elements connecting the centre housing to the vehicle are attached to houses of drives of the centre housing in an integrated manner, whereas housings of the side drives, the centre housing and said suspension elements are formed as a compact unit.

Various optional or preferred features are set out in the detailed description forming pan of this specification.

Thus, in one exemplified embodiment of this invention, the suspension elements and the housings of the side drives are made of one piece.

It is also preferred, according to the invention, that the suspension elements include substantially C-shaped arms having a closed profile, as well as connecting points for attaching the axle assembly to the vehicle, whereas on ends of the C-shaped arms lying away from the centre housing, air spring pads and shock-absorber pads are arranged.

A further preferred embodiment is a unit in which the centre housing and a housing of the main drive are made as a one-piece cast element.

Finally, it is also preferred that inner rings of bearings of transmission gears of the side drives, a distance ring arranged between the inner rings of the bearings and side walls of the side drives, as well as a threaded bolt penetrating the side walls of the side drives, and a threaded disk arranged on a threaded portion of the bolt form parts of a pre-stressed system.

BRIEF DESCRIPTION OF THE DRAWINGS

Embodiments of this invention will now be described by way of example with reference to the accompanying drawings, in which.

DETAILED DESCRIPTION OF THE PREFERRED EMBODIMENTS

Figure 1:
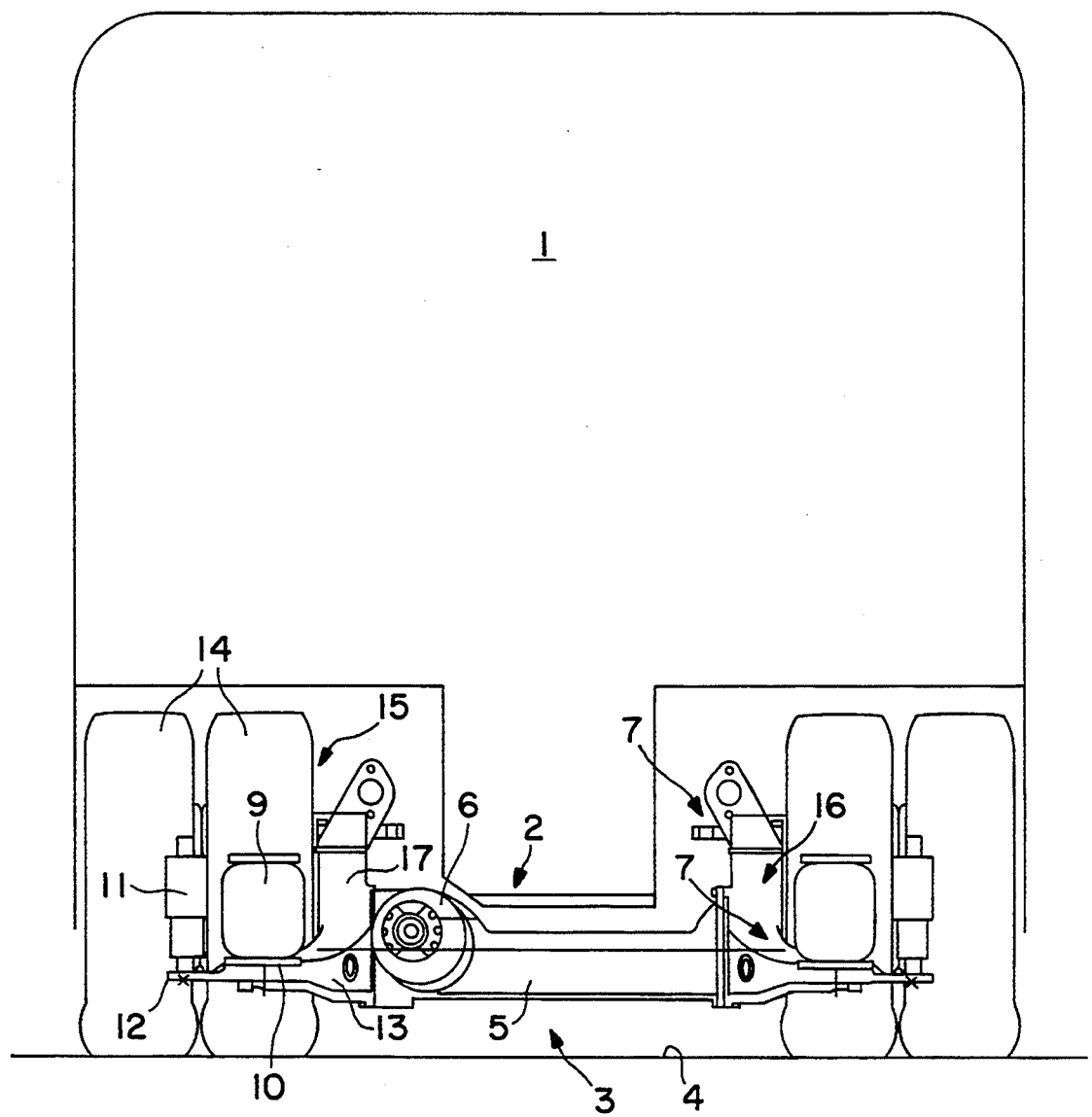
FIG. 1 illustrates a preferred embodiment of the axle assembly as in this schematic view of a vehicle with an axle assembly in a portal arrangement.

In FIG. 1 of the exemplified embodiment, it can be well observed that a floor level 2 of a vehicle 1 is, in contrast to the conventional solutions, quite low, i. e. near to ground level 4, thanks to an axle assembly 3 in a portal arrangement. For this, however, a centre housing 5 of the axle assembly 3 must be very low and a housing 6 of the main drive of axle assembly 3 must be pushed aside as far as possible.

In the sense of the invention, integrated parts of the axle assembly 3 as improved in this invention are suspension elements 7. These comprise, on one hand, suspension blocks 8 (FIG. 3) for connection of the fasteners attaching the axle assembly 3 to the frame of the vehicle 1 and, on the other hand, pads 10 supporting air springs 9 of the vehicle 1 and pads 12 supporting shock-absorbers 11 of the vehicle 1, as well as arms 13 (FIG. 3) integrated to housings 17 of side drives 16. Wheels 14 of vehicle 1 are arranged on hub units 15 being connected to the housings 17 the of side drives 16 at the extremities of the centre housing 5.

Figure 2:
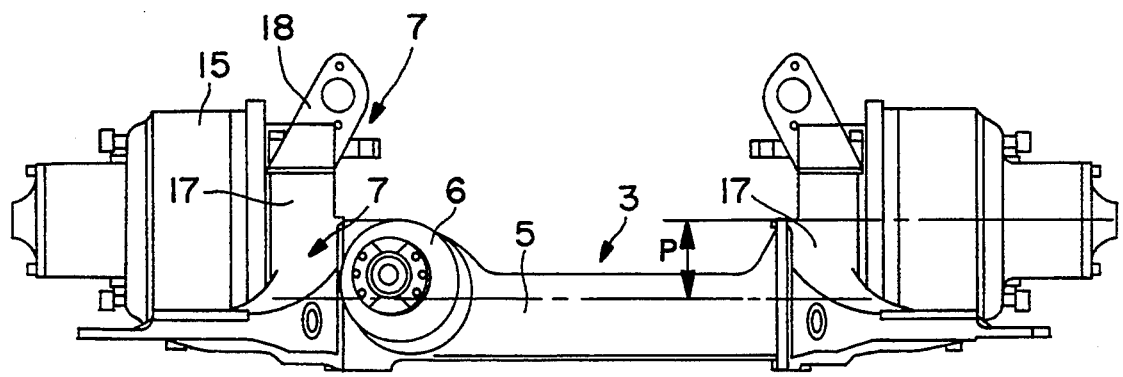
FIG. 2 is a side elevational view of the embodiment in FIG. 1 seen from the input side.
Figure 3:
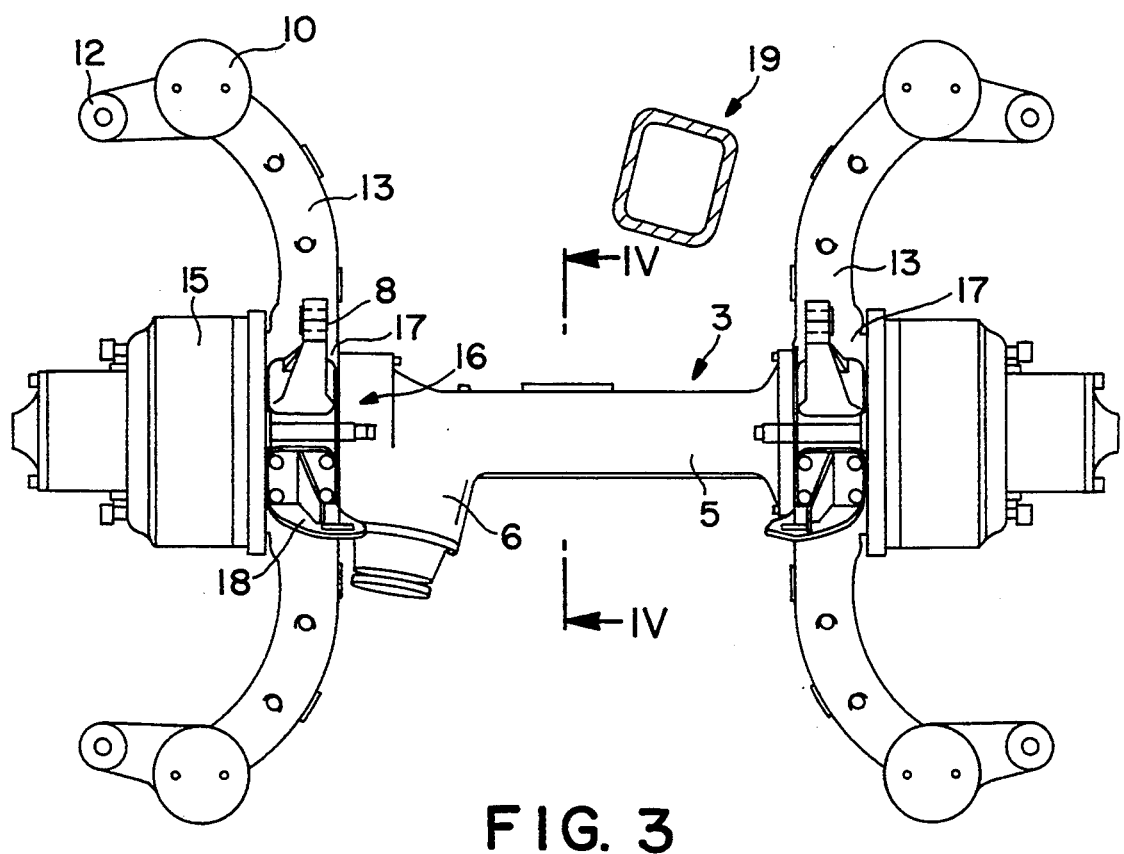
FIG. 3 is a top view of the embodiment in FIG. 1.

In FIGS. 2 and 3, the axle assembly 3 according to the invention is illustrated in a dismounted position. In FIG. 2, hub units 15 attached to the housing 17 as well as the main drive 6 pushed aside on the centre housing 5 can be well observed. This figure shows, too, that suspension elements 7 forming integral parts of the axle assembly 3 are made by casting, what's more, they are cast as one piece with the housing 17. The same can be seen in the top view of FIG. 3.

FIG. 2 illustrates, at the same time, the portal distance P which is the distance between the longitudinal axis of the differential gear unit arranged in main drive 6 and the longitudinal axis of the hub unit 15. This is the distance which the floor level 2 (FIG. 2) of the vehicle 1 can be lower than that of the conventional arrangements.

In FIG. 3, the side drive 16 arranged between the main drive 6 and the hub unit 15 can be seen. It provides the kinematical connection between the drive elements. On both sides of the centre housing 5, housings 17 of side drives 16, the pads 10 and 12 as well as the C-shaped arms 13 form a compact and integrated unit, namely, these pieces are cast as one piece, in this example. Similarly, the centre housing 5 and the housing of the main drive 6 are also cast as one piece. The suspension blocks 8 serve the connection of fastener stems with which the position of the axle assembly 3 is fixed with respect of the vehicle 1. Beneath suspension blocks 8, mounting pads 18 are arranged for the purpose of arranging the brake cylinders (not shown) on the vehicle 1.

In FIG. 3, a cross section 19 of arms 13 is also shown. The cross section 19 is formed as a closed profile to have uniform strength throughout the whole length of the arm 13.

Figure 4:
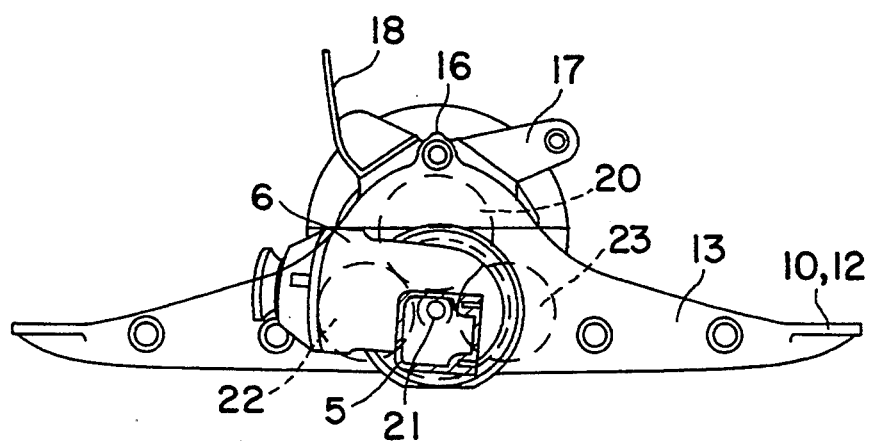
FIG. 4 shows a sectional view along line IV—IV in FIG. 3.

In FIG. 3, the compact arrangement of the axle assembly 3 according to the invention is well illustrated. In this solution, the housings 17 of the side drives 16, the pads 10 and 12, the arms 13, the centre housing 5, the housing of the main drive 6, as well as the tightly connected suspension blocks 8 and the mounting pads 18; form a uniform unit which can be mounted into the vehicle 1 without any auxiliary element. In FIG. 4, dashed lines show gears 20 and 21 of side the drives 16 as well as transmittal gears 22 and 23 connected to the gears 20 and 21.

Figure 5:
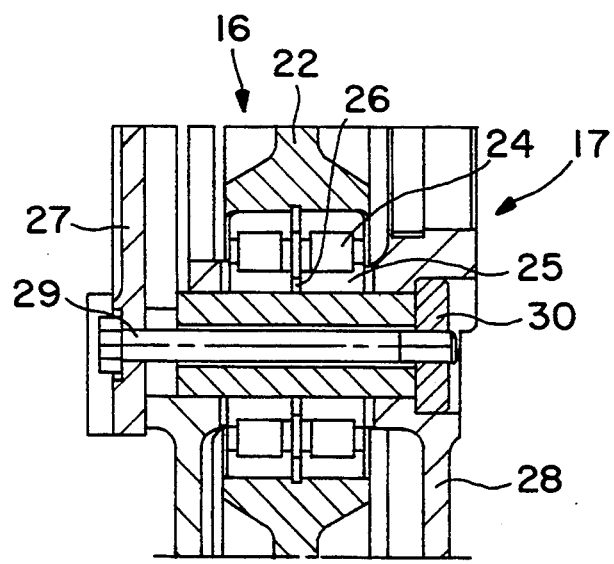
FIG. 5 shows a portion of the embodiment in FIG. 1, i.e. a section of the side drive taken in a plane running through the axis of the transmittal gear of the side drive.

FIG. 5 illustrates a cross section of the side drive 16 in a plane running through the axis of the transmittal gear 22. Transmittal gear 22 runs on two bearings 24, between inner rings 25 on which a distance ring 26 is arranged. Opposite housing walls 27 and 28 of the housing 17 of the side drive 16 are pre-stressed against each other by a threaded through-bolt 29 having a threaded disk 30 on its threaded one end. The inner rings 25 of the bearings 24, with the distance ring 26 between the inner rings 25 and the side walls 27 and 28, form a pre-stressed system, wherein the stress can be adjusted by the co-operation of the bolt 29 and the disk 30. This arrangement has the beneficial effect of considerably decreasing the independent deformations of the opposite walls 27 and 28 of the housing 17 of the side drive 16 which results in gears running more accurately within the housing 17. As a matter of course, the same arrangement can be found at the transmittal gear 23 as well.

The most important advantage is apparent in the increased strength of the arrangement as described. The axle assembly 3 is a compact unit and will be looked upon by the bus producer as one piece. With this, the necessity of separate elements connected to each other by a series of threaded connections is eliminated. The construction of uniform strength allows optimal load bearing and load distribution as well as the lowest possible weight and outer measurements of the axle assembly. This construction and the pre-stressed arrangement shown in FIG. 5 are preferred for smooth operating and, increased running accuracy of relatively complicated gear drives used in the axle assembly 3; thus, these elements will not be subject to wear and will not cause as much noise as the prior out. The suspension arms 13 being cast in one piece with the housings 17 of the side drives 16 are beneficial for leading away the inconvenient heat produced in the gear drives, this being a quite important advantage when the usually wrong ventilation of axle assemblies in a portal arrangement is considered.

We claim:

1. A driven axle assembly for a vehicle, said assembly having a centre housing, a main drive being arranged in the centre housing and including a differential gear unit, side drives arranged on outer ends of the centre housing, and wheel hub units connected to the side drives, respectively, wherein a portal distance is provided between a longitudinal axis of the differential gear unit and a longitudinal axis of the wheel hub units, said assembly also comprising:

suspension elements connecting the centre housing to the vehicle;

first means for housing the side drives arranged on outer ends of the centre housing; and second means for housing the side drives arranged on outer ends of the centre housnig;

said suspension elements being attached to said first housing means for the main drive and also to said second housing means for the side drives of the centre housing in an integrated manner;

said second housing means for the side drives, said centre housing, and said suspension elements being formed as a compact unit;

wherein inner rings of bearings of transmission gears of the side drives, a distance ring arranged between the inner rings of the bearings and side walls of the side drives, a threaded bolt penetrating the side walls of the side drives, and a threaded disk arranged on a threaded portion of the bolt, form parts of a pre-stressed system.

2. A driven axle assembly as recited in claim 1, wherein:

said suspension elements and said second housing means for the side drives are made of one piece.

3. A driven axle assembly as recited in claim 1, wherein:

said suspension elements include substantially C-shaped arms having a closed profile; and said suspension elements also include connecting means for attaching the axle assembly to the vehicle.

4. A driven axle assembly as recited in claim 3, further comprising:

air spring pads and shock-absorbing pads arranged on ends of the C-shaped arms lying away from the centre housing.

5. A driven axle assembly as recited in claim 1 wherein:

said centre housing and the first housing means for the main drive are made as a one-piece cast element.

* * * * *